(12) United States Patent
Mazzetti et al.

(10) Patent No.: US 11,712,044 B2
(45) Date of Patent: Aug. 1, 2023

(54) HOLLOW CONFECTIONERY PRODUCT

(71) Applicant: SOREMARTEC S.A., Findel (LU)

(72) Inventors: Marco Mazzetti, Strassen (LU); Enrico Pavesi, Alba (IT); Sergio Mansuino, Castiglione Falletto (IT)

(73) Assignee: SOREMARTEC S.A., Findel (LU)

( * ) Notice: Subject to any disclaimer, the term of this patent is extended or adjusted under 35 U.S.C. 154(b) by 445 days.

(21) Appl. No.: 15/945,465

(22) Filed: Apr. 4, 2018

(65) Prior Publication Data

US 2018/0289031 A1 Oct. 11, 2018

(30) Foreign Application Priority Data

Apr. 10, 2017 (LU) ........................................ 100167

(51) Int. Cl.
| | | |
|---|---|---|
| *A23G 1/54* | (2006.01) | |
| *A23G 1/30* | (2006.01) | |
| *A23G 1/32* | (2006.01) | |
| *A21D 13/24* | (2017.01) | |
| *A23G 9/48* | (2006.01) | |
| *A23G 3/54* | (2006.01) | |

(52) U.S. Cl.
CPC ............. *A23G 1/545* (2013.01); *A21D 13/24* (2017.01); *A23G 1/305* (2013.01); *A23G 1/32* (2013.01); *A23G 3/545* (2013.01); *A23G 9/485* (2013.01); *A23V 2002/00* (2013.01)

(58) Field of Classification Search
CPC ................................. A23G 1/545; A23G 1/305
USPC ........................................................ 426/103
See application file for complete search history.

(56) References Cited

U.S. PATENT DOCUMENTS 1,649,308 A * 11/1927 Hunter ................. A23G 3/2015
425/133.1
1,865,097 A 6/1932 Gilham
8,795,751 B2 * 8/2014 Leadbeater .......... A23G 1/0063
249/136

FOREIGN PATENT DOCUMENTS

| EP | 0951835 A2 * | 10/1999 | ............... A23G 3/50 |
|---|---|---|---|
| EP | 1 604 573 A1 | 12/2005 | |
| GB | 1 427 496 A | 3/1976 | |

(Continued)

OTHER PUBLICATIONS

Janette "Easter Chocolate Crème Eggs" Mar. 22, 2015 https://culinaryginger.com/easter-chocolate-creme-eggs/ pp. 1-20 (Year: 2015).*

(Continued)

*Primary Examiner* — Jyoti Chawla
(74) *Attorney, Agent, or Firm* — Rothwell, Figg, Ernst & Manbeck, P.C.

(57) ABSTRACT

A confectionery product is provided. The product includes a hollow body formed by at least one first material. Present on the outer surface itself of the product is a second material, different from said first material, which reproduces a decorative element. The hollow body comprises a first outer layer, formed by the first material and at least one second layer, formed by the second material, which is set internally, on the first layer. The first layer has an opening that allows a portion of the second layer to emerge on the outer surface, so as to form the decorative element. The first outer layer and the portion of the second layer together define the outer surface. The second layer coats the inner side of the first layer at least partially and at a position away from the opening.

10 Claims, 4 Drawing Sheets

(56) References Cited

FOREIGN PATENT DOCUMENTS

JP          60098947     *  6/1985

OTHER PUBLICATIONS

LaBau "Brownie-Filled Chocolate Easter Eggs" Apr. 18, 2015 https://www.ohnuts.com/blog/brownie-chocolate-easter-eggs/ pp. 1-11 (Year: 2015).*
Bettina "Homemade vegan Easter eggs" https://www.jamieoliver.com/features/vegan-easter-eggs-easter-recipes/ pp. 1-4 Mar. 24, 2016 (Year: 2016).*
Temple "How to Make Hollow Chocolate Confetti Eggs" pages Mar. 27, 2013 pp. 1-11 (Year: 2013).*
Chocolate Easter Eggs by Gemma Stafford obtained from https://www.biggerbolderbaking.com/chocolate-easter-eggs/ date of post Mar. 23, 2015 (Year: 2015).*
ChocolateEasterEggsbyGemmaStaffordobtainedfromhttps:/Avww.biggerbolderbaking.com/chocolate-easter-eggs/ dateofpostMar. 23, 2015(Year:2015) (Year: 2015).*
Extended European Search Report dated May 24, 2018 cited in European Application No. 18166208.1, 7 pages.

* cited by examiner

HOLLOW CONFECTIONERY PRODUCT

CROSS REFERENCE TO RELATED APPLICATION

This application claims priority to Luxembourgian Patent Application No. 100167 filed on Apr. 10, 2017, the disclosures of which is incorporated herein in its entirety by reference.

FIELD OF THE INVENTION

The present invention relates in general to hollow confectionery products, and more in particular to hollow confectionery products that present on their outer surface decorations formed by an additional material applied on the main body of the product. Usually, products of this type are made of chocolate, and the decorations are made with solidifiable doughs and pastes of various kinds, for example sugar paste, semi-finished products of a chocolate type with natural colorants (for example, for decorations on Easter eggs), coloured sugar-based compounds, etc.

PRIOR ART

FIGS. 4A-4B and 5A-5B illustrate two known solutions for producing a product of the type in question.

The known solution illustrated in FIGS. 4A and 4B is typically implemented in home-type bakeries and envisages a decorative element 102 that is applied on the outer surface of the hollow body 104 so as to be in relief with respect to the surface itself. The decorative element is anchored to the surface of the body 104 via a localized melting of the corresponding parts in mutual contact, or else via adhesive pastes commonly used in the sector.

The solution of FIGS. 5A and 5B differs from the one just described in that the decorative element 102' is recessed in the wall of the hollow body 104' so as to be flush with its outer surface. In this solution, the hollow body and the decorative element are both formed in one and the same moulding device, which carries out in succession two pouring steps, the first for the decorative element, and the second for the hollow product, or vice versa. On account of the more complex production means that are required, this solution is prevalently used in the context of industrial processes.

It should now be noted that the solution of FIGS. 4A and 4B presents the drawback of arranging the decorative element 102 in a critical position as regards possible impact of the product with objects external to the product, since it is totally exposed, thus risking being chipped, fractured, or damaged in some other way. Given the brittleness of the product, this solution is hence far from suited for a production of an industrial type.

The solution of FIGS. 5A and 5B overcomes at least in part the aforesaid drawback thanks to the fact that the element 102 is inserted in the wall of the hollow body.

SUMMARY AND OBJECT OF THE INVENTION

In any case, in the technical field here of interest there is a constant search for solutions that will improve the quality of the product and will also be able to preserve the integrity thereof up to the final moment when the product is consumed.

The above object is achieved by a confectionery product having the characteristics specified in claim 1.

The claims form an integral part of the technical teaching provided herein in relation to the invention.

BRIEF DESCRIPTION OF THE DRAWINGS AND DETAILED DESCRIPTION OF ONE OR MORE EMBODIMENTS OF THE INVENTION

Further characteristics and advantages of the invention will emerge clearly from the ensuing description with reference to the annexed drawings, which are provided purely by way of non-limiting example and in which.

Figure 1:
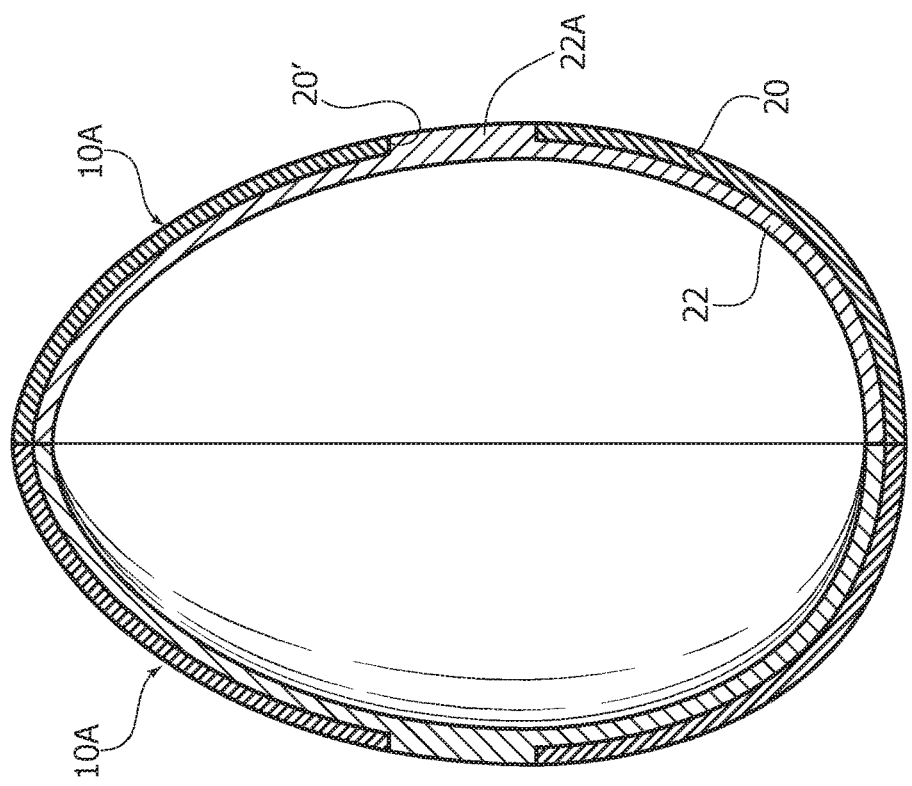
FIG. 1 illustrates, according to an axonometric view, an example of the product described herein.

In the ensuing description, various specific details are illustrated aimed at providing an in-depth understanding of the embodiments. The embodiments may be obtained without one or more of the specific details, or with other methods, components, or materials, etc. In other cases, known structures, materials, or operations are not illustrated or described in detail so that various aspects of the embodiments will not be obscured.

The references used herein are provided merely for convenience and hence do not define the sphere of protection or the scope of the embodiments.

First of all, it is to be noted that by the term "hollow product" as used herein is meant any product formed by a shell having a generic concave conformation, whether closed or open. This product may thus be, for example, an Easter egg, a chocolate bell, a hollow figure in the form of a squirrel, Santa Claus, a snowman, etc. On the other hand, as will be seen in what follows, even though chocolate products are the main sphere of application envisaged by the present applicant for the solution presented herein, in effect this solution may advantageously be used also for other types of products, such as semi-finished products of similar type, sugar paste, wafer products, etc.

The hollow product described herein differs from the known solutions illustrated above in that the decorative element is obtained through a layer of material that is applied internally on the wall of the product and that emerges, with a portion thereof, on the outer surface, through an opening made in the wall itself.

In general, the product described herein has a hollow body comprising:
  an outer layer, formed by a first material, which comes to define a prevalent portion of the outer surface of the product; and
  a second layer, formed by a second material, which is set internally, on the first layer,
  wherein the first layer has an opening that allows a portion of the second layer to emerge on the outer surface, this portion forming the decorative element of the product.

As will become evident in what follows, thanks to this configuration, the decorative element of the product described herein is firmly connected to the wall of the hollow body, i.e., to the aforesaid outer layer, not only, simply, by adhesion between materials, but also, and above all, through the coupling, which is, in effect, of a mechanical type, that is established between the outer wall and the inner layer on which the decorative element is obtained.

To facilitate understanding of the solution described herein, reference will now be made to FIGS. 1 and 2, which represent an example of product according to this solution.

The product illustrated, as a whole designated by the reference number 10, is a chocolate egg constituted by two half-shells 10A that both present on their outer surface the letter K. This letter will be clearly of a colour different from the remaining part of the outer surface of the product, so that it can be distinguished therefrom.

To reproduce the letter K referred to above, each of the two half-shells 10A has:
- an outer wall 20 made of chocolate, in which a through opening 20' is obtained that has a profile corresponding to the shape of the letter K reproduced;
- an inner layer 22 made of different material, which is applied on the inner side of the wall 20, coating it totally, and, moreover, comes to fill completely the cavity of the opening 20', with a portion 22A thereof that comes to be flush with the outer surface of the wall 20.

With the aforesaid portion 22A the layer 22 reproduces the decorative element, represented, in the case in point, by the letter K.

The material of the inner layer 22 is different at least in colour from the chocolate material of which the wall 20 is made. This material may itself be chocolate or else material of some other type.

Figure 2:
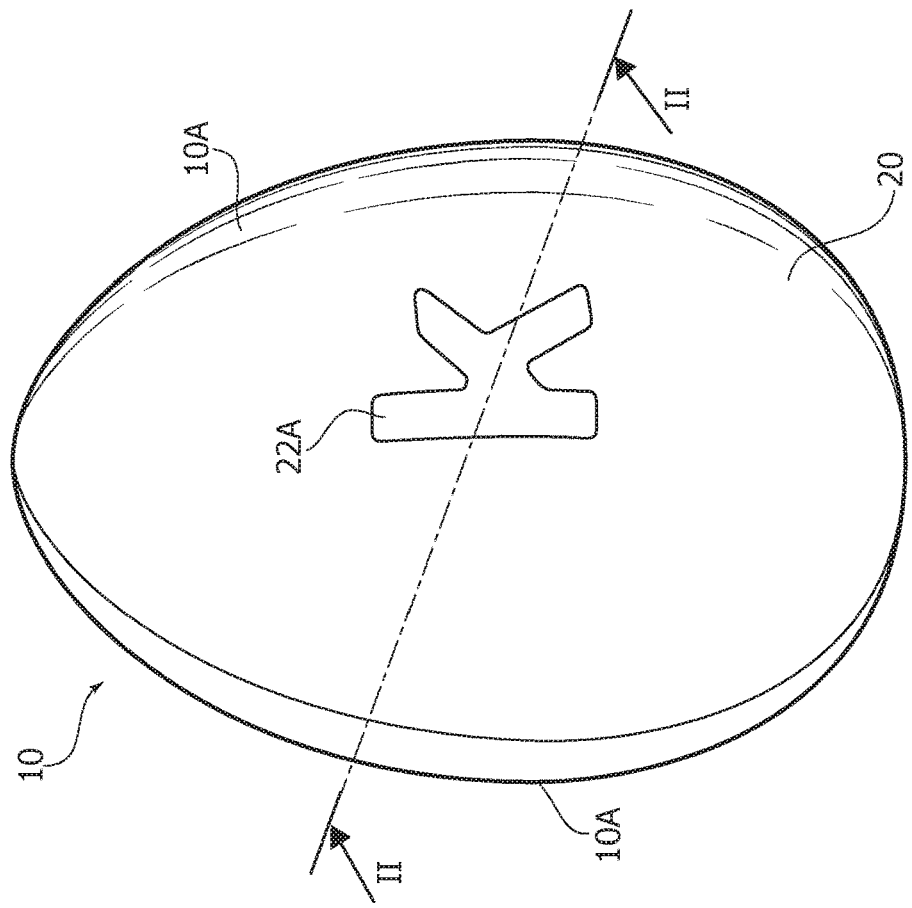
FIG. 2 is a cross-sectional view of the product of FIG. 1 according to the plane of section II-II.

With particular reference now to FIG. 2, it will be noted that the portion 22A contained within the opening 20' of the outer wall 20 is to all effects withheld in its seat from inside via the entire layer 22 that rests against the inner side of the wall 20.

The connection thus obtained between the decorative element and the hollow body of chocolate is practically indissoluble. Incidentally, it should be noted that the inner layer 22 may also present a smaller extension than the inner surface of the wall 20 and hence coat only a portion of the aforesaid surface.

The present applicant has found, in general, that the above configuration not only prevents detachment of the decorative element from the outer shell, but in effect also strengthens the decorative element itself.

Among other things, the solution described herein also enables provision of different decorative elements arranged on top of one another, without any problem of detachment due to the incompatibility of the materials in regard to mutual adherence.

Figure 3B:
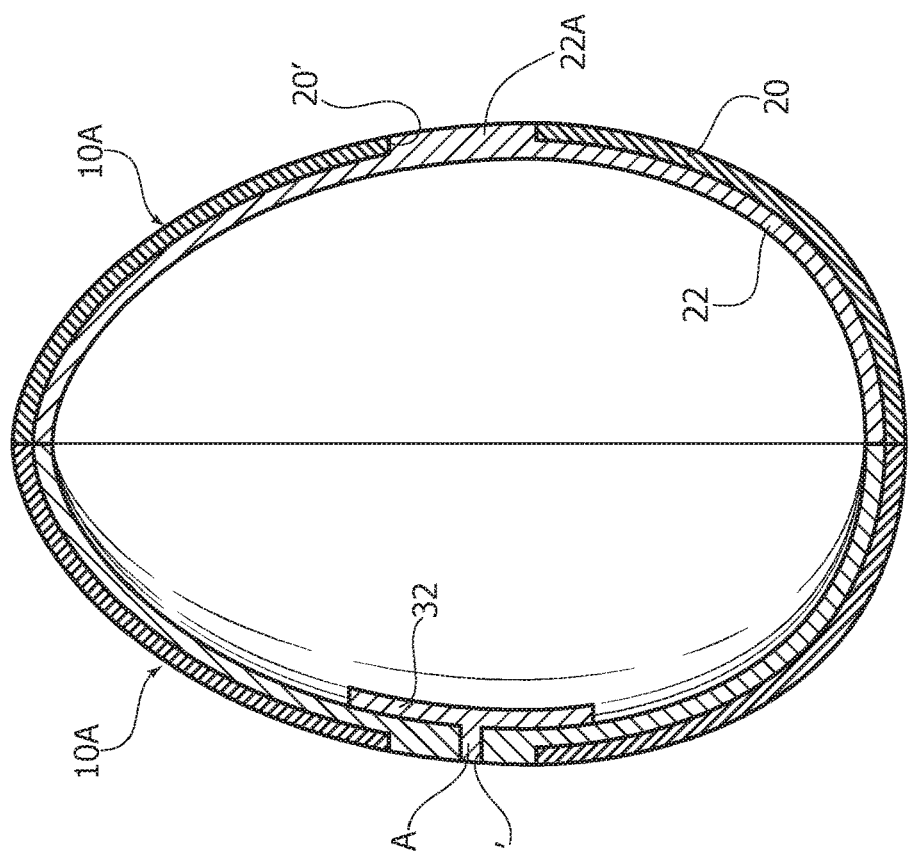
FIGS. 3A and 3B illustrate a further example of the product described herein, according to an axonometric view and a cross-sectional view, respectively.
Figure 3A:
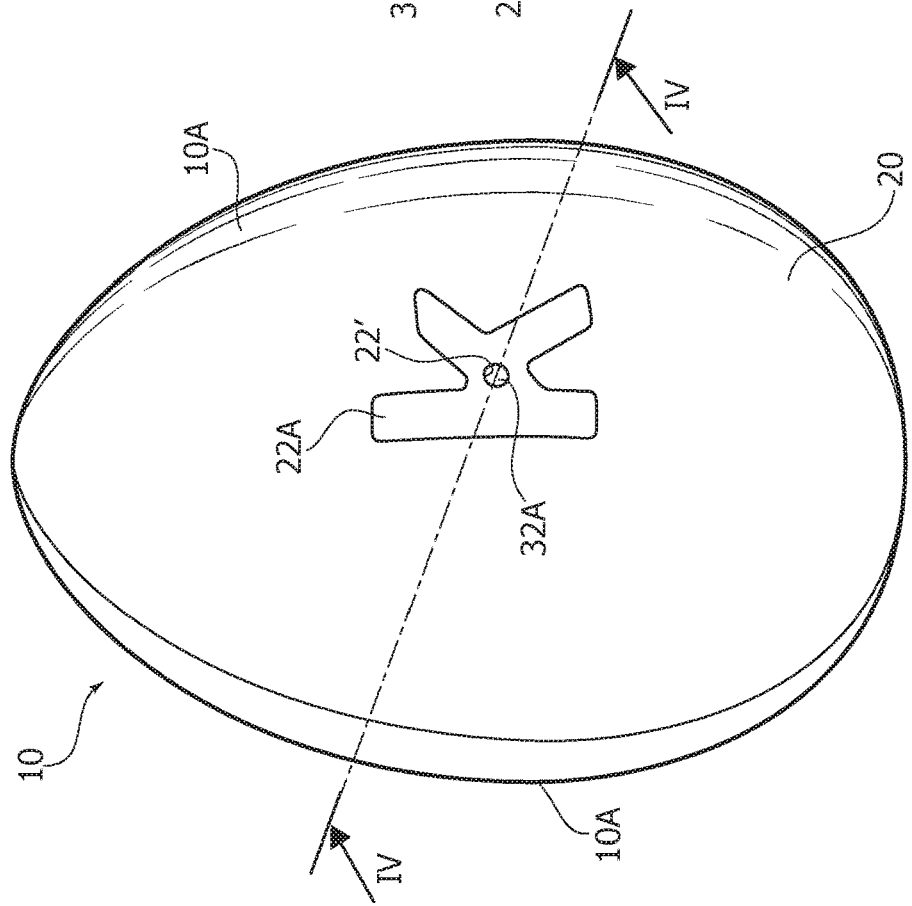
Figure 4B:
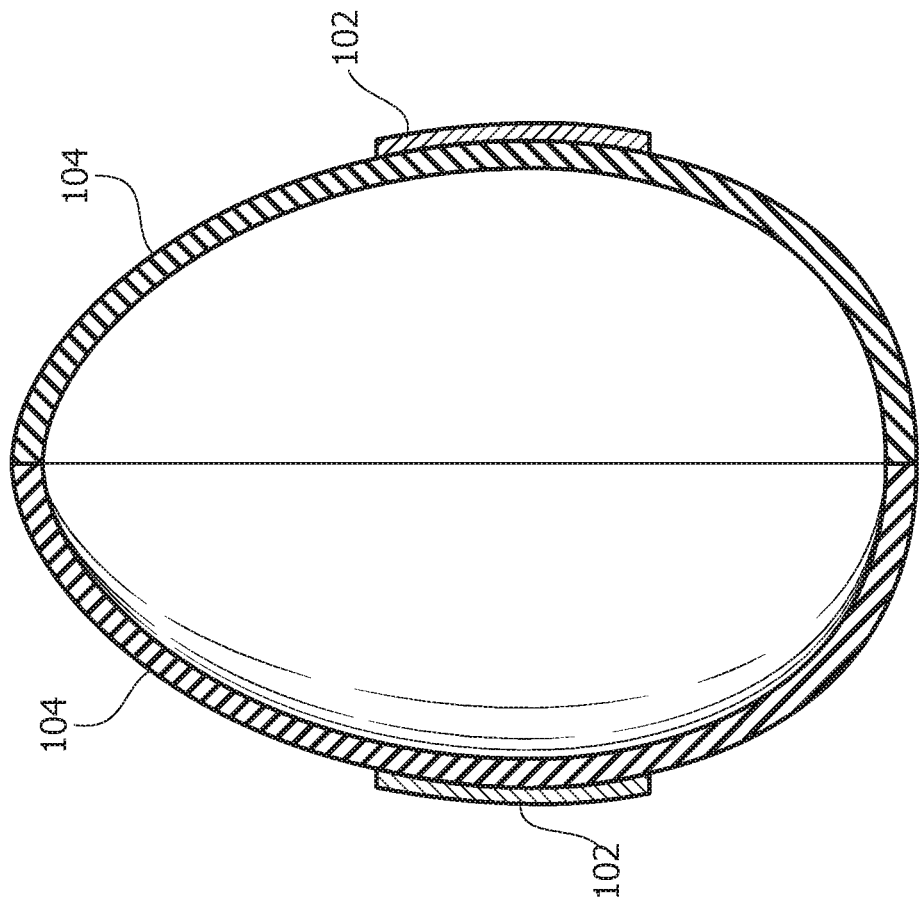
FIGS. 4A and 4B illustrate a solution of the prior art, according to an axonometric view and a cross-sectional view, respectively.
Figure 4A:
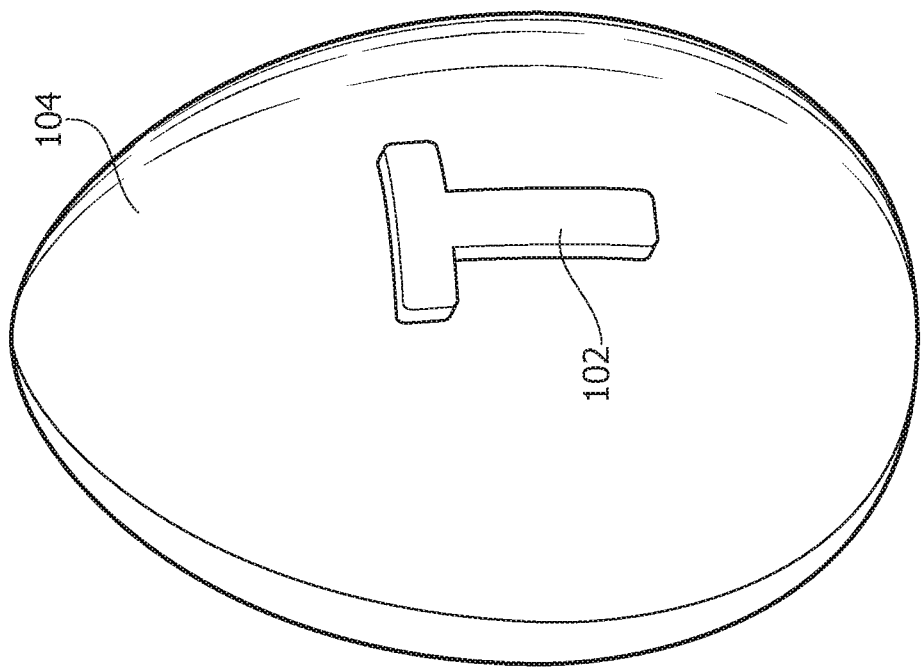
Figure 5A:
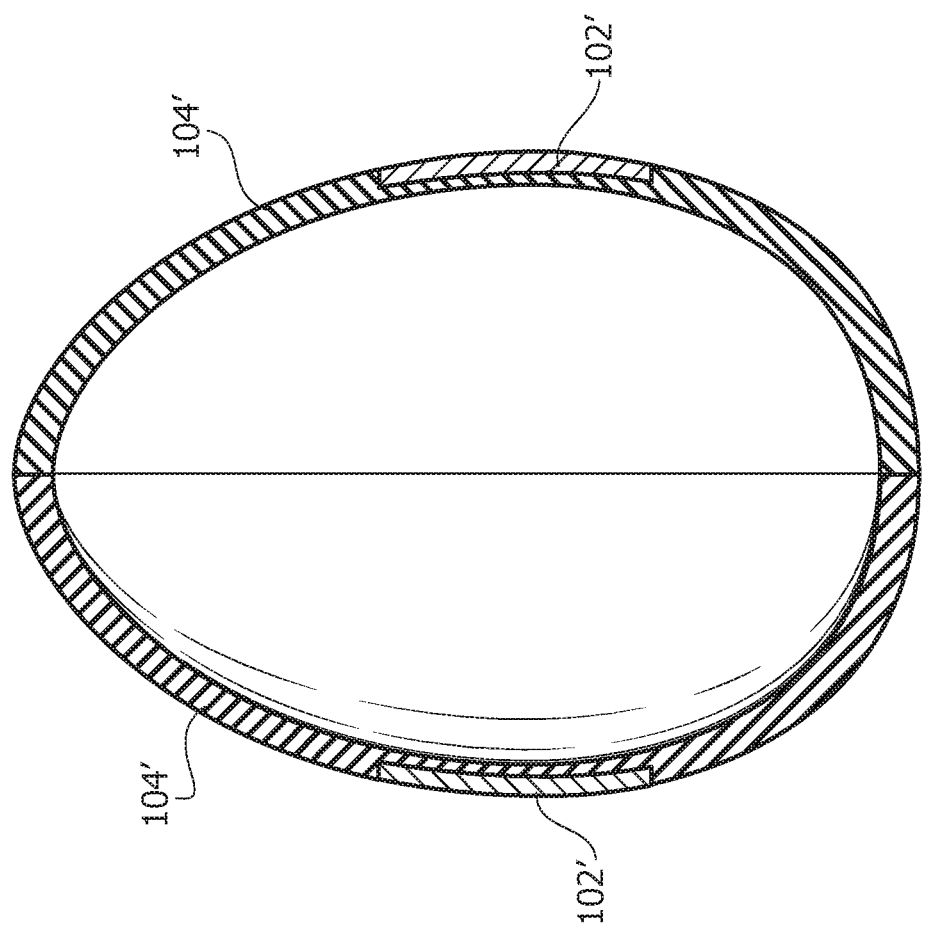
FIGS. 5A and 5B illustrate a further solution of the prior art, according to an axonometric view and a cross-sectional view, respectively.
Figure 5B:
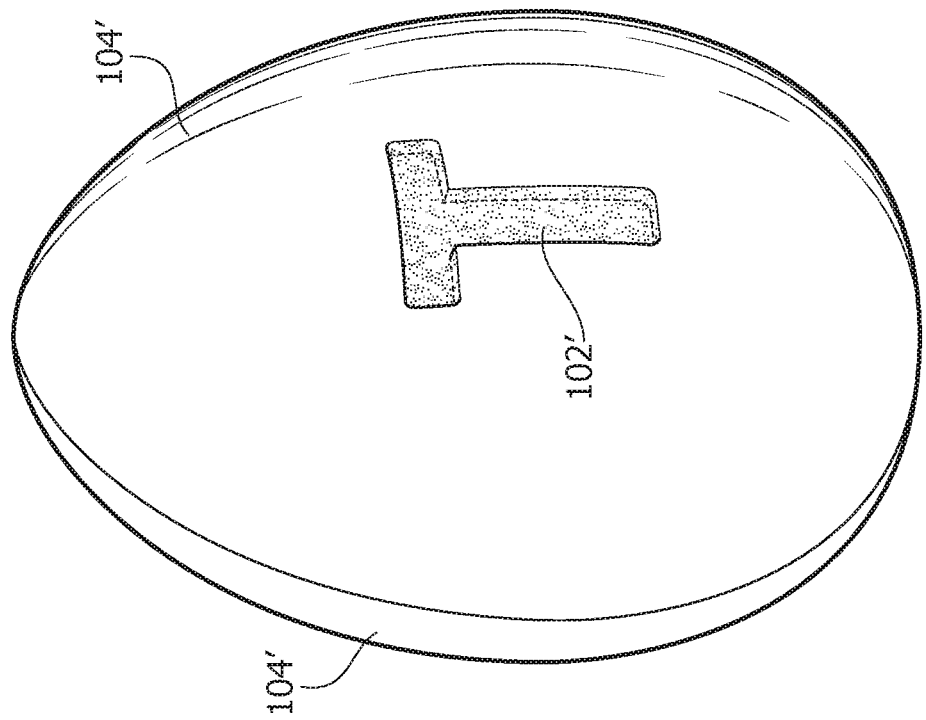

In this connection, FIGS. 3A and 3B illustrate a product similar to that of FIGS. 1 and 2 (the parts in common are designated by the same reference numbers), where on the layer 22, which forms the first decorative element 22A, a further layer 32 is applied that comes to define a second decorative element 32A, having the shape of a circle, according to the same modality described above. In particular, the layer 22 has itself a through opening 22', and the layer 32 applied thereon comes to fill completely the cavity of the opening with its portion 32a, thus remaining flush with the outer surface of the portion 22A (or else even projecting beyond the surface). The further layer 32 will be made of a different material, at least as regards colour, both with respect to the layer 22 and with respect to the wall 20.

As may be seen in FIG. 3B, in this case the further layer 32 is applied on the inner side of the layer 22, coating it only partially.

In the final analysis, the product described herein presents, as compared to known solutions, as less subject to defects of production or to the risk of breaking, and hence constitutes a product of higher quality.

As mentioned previously, the solution described herein may be used for any hollow product and not only for chocolate products. In general, this solution may be used with any mouldable material, i.e., one that can be formed in a mould. Some examples are represented by chocolate surrogates, sugar syrups, wafers or other materials for baking products. The product may also include a filling contained inside the product's shell. In some embodiments, the filling itself may constitute the disclosed inner layer that emerges on the product's outer surface and forms the decorative element.

With reference now to the method of production of the product described herein, it will be clear for the person skilled in the sector that it will envisage two distinct operations of moulding (or modelling), one for the outer wall and the other for the inner layer, as is already the case for the production of the known solutions referred to at the start. It is in particular preferable to obtain first the outer wall and its opening, and then form thereon the inner layer, which comes to fill the aforesaid opening as illustrated above.

For the production of the outer wall provided with an opening, it is possible to envisage a first operation of pouring into the mould the material constituting the outer shell, followed by a subsequent step of turning over the mould to enable dripping-off thereof, then making the opening with closed rim using a purposely designed punch when the chocolate has a structure that is still soft. Alternatively, there may be adopted techniques of moulding with use of an appropriately configured mould and counter-mould, which provide the outer half-shell having an opening with closed rim. To obtain the inner wall connected to the decoration, the aforesaid conventional technology of pouring and dripping of the mould may be used, or else the technology that envisages the use of a mould and counter-mould.

The forming techniques referred to above are altogether conventional, so that a detailed treatment thereof is not necessary herein.

Of course, without prejudice to the principle of the invention, the details of construction and the embodiments may vary, even significantly, with respect to what has been illustrated herein purely by way of non-limiting example, without thereby departing from the scope of the invention, as is defined by the annexed claims.

The invention claimed is:

1. A confectionery product, said product comprising:
   a hollow body formed by at least one first material that defines an outer surface of said product, wherein, present on the outer surface itself of said product is a second material, different from said first material, which reproduces a decorative element and is edible, and
   a further hollow body coupled to said hollow body, said hollow body and said further hollow body forming together a closed shell,
   wherein said hollow body comprises a first outer layer, formed by said first material and at least one second layer, formed by said second material, which is set internally, on said first layer, wherein said first layer has an opening that allows a portion of said second layer to emerge on said outer surface, so as to form said decorative element, wherein said first outer layer and said portion of said second layer together define said outer surface, wherein said second layer coats the inner side of said first layer at least partially and at a position away from said opening, wherein said portion is housed within said opening, and wherein said portion and said opening have corresponding profiles, thus providing a mutual shape fit, and wherein at any location of said outer surface not within said opening, a part of said first layer is positioned over a part of said second layer such that said part of said second layer is in contact with said part of said first layer, and wherein the first layer of the hollow body and a first layer of the further hollow body have corresponding edges coupled together to form a closed shell.

2. The product according to claim 1, wherein the outer side of said portion is flush with the outer surface of said first layer.

3. The product according to claim 1, wherein said second layer coats the inner side of said first layer totally.

4. The product according to claim 1, wherein said second layer coats the inner side of said first layer only partially.

5. The product according to claim 1, wherein at least said first material is chocolate.

6. The product according to claim 1, wherein said second material is a chocolate surrogate or else dried sugar syrup.

7. The product according to claim 1, wherein said portion housed within said opening is held mechanically from inside via said second layer that rests against the inner side of the first layer.

8. The product according to claim 1, wherein a filling distinct from the second layer is provided within the hollow body.

9. The product according to claim 1, wherein a thickness of said portion of said second layer is greater than a thickness of a part of said second layer away from said portion.

10. The product according to claim 1, wherein the opening of the first layer defines first and second surfaces of the first layer and wherein the second layer is in contact with both of the first and second surfaces.

* * * * *